Feb. 28, 1961 F. W. HANKS 2,972,886
FLUID METERS
Filed May 23, 1956

INVENTOR.
FREDERICK W. HANKS
BY
Oberlin & Limbach
ATTORNEYS.

United States Patent Office 2,972,886
Patented Feb. 28, 1961

2,972,886
FLUID METERS
Frederick W. Hanks, 646 E. 106th St., Cleveland, Ohio; Louise L. Hanks, administratrix of said Frederick W. Hanks, deceased Filed May 23, 1956, Ser. No. 586,784
5 Claims. (Cl. 73—258)

This application is a continuation-in-part of my copending application Serial No. 212,473, now abandoned, which was filed on February 23, 1951. It is thus likewise concerned with improvements in the construction of fluid meters, with particular regard to ensuring proper operation over very long periods of use.

Fluid meters are subject in normal use to widely varying and abruptly changing internal pressure conditions. The volume of the fluid stream through the meter may at times be full capacity, while at other times it may be minimal, and when the stream is turned on there is a rush of pressure abruptly applied to the mechanism; when the stream is shut off there is a further abrupt drop in the internal pressure. The usual operation thus produces considerable stress in the mechanism, which involves customarily moving parts in the fluid stream and a separately mounted register mechanism to which the motion is communicated for indicating the rate of fluid flow.

Unless the stresses induced in the various parts are adequately taken care of, the meter is subject to undue binding and frictional wear, rendering the structure prone to break down and limiting the working life of the same. It is accordingly a primary object of the invention to provide meter construction particularly able to withstand such stresses and without undue mechanical complication.

Another object is to minimize friction and thus wearing of the moving parts, particularly in the register mechanism. It is also an object of the invention to provide such a meter which is protected against improper operation, such as resulting from some unusual reversal in the flow through the meter.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
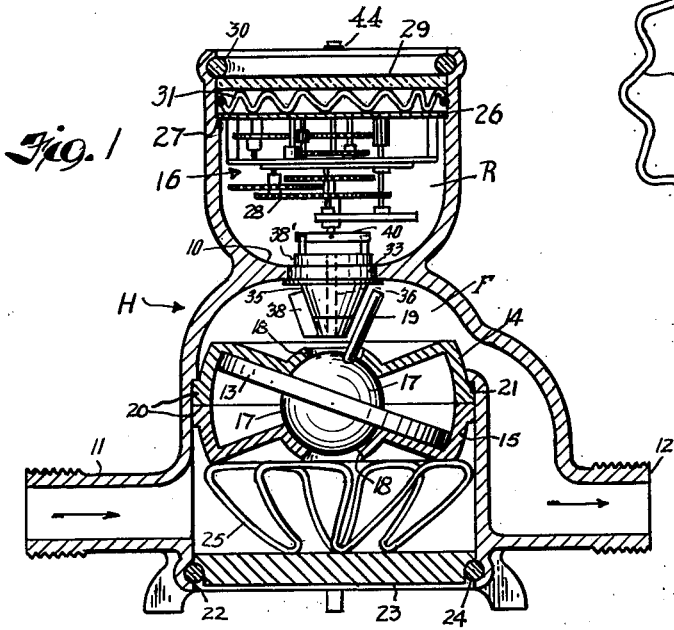
Fig. 1 is a vertical sectional view of a meter construction embodying the invention.

Referring now to the drawings in detail, the new meter comprises a housing H which defines a fluid chamber or compartment F in its lower portion and a register compartment or chamber R in its upper portion, the two being separated by a partition 10. The fluid chamber is provided with an inlet connection 11 and an outlet connection 12 whereby the fluid to be metered passes through such chamber and operates impeller mechanism which is here in the form of a conventional nutating disc 13 housed within a casing made up of symmetrical sections 14 and 15. Register mechanism, designated generally by reference numeral 16, as disposed in the upper chamber R.

The impeller mechanism is essentially conventional, the casing ends being dished or contoured to the range of movement of the nutating piston 13 housed therewithin and such piston has hemispherical bearing portions 17 seated in conically flared openings 18 of the two casing sections. A spindle 19 projects upwardly through the top such opening, and both the disc and the casing are provided with the usual ports and means precluding rotation of the piston, not shown, whereby the flow of the fluid through the assembly causes the piston to rock and the projecting spindle to sweep about an orbit.

In the present construction, the impeller casing sections 14 and 15 are formed with peripheral flanges 20 at their abutting inner edges, which together form an annular band. The inner wall of the main housing in the fluid compartment F is provided with a shoulder 21 adapted to overlie the top of such band, thereby to limit movement of the mechanism upwardly or in the direction of the partion 10.

The housing H has a bottom opening 22 which is normally closed by a plate 23, with a gasket-like holding member 24 of rubber, plastic or metal seated in grooves formed correspondingly in the periphery of the closure plate and the adjacent housing wall. Within the fluid chamber, and supported on the closure plate 23, there is a compound spring 25 bearing against such plate and against the lower peripheral portion of the impeller casing.

Thus the impeller casing is resiliently held in position against the shoulder 21, without any pressure applied to the central portion of the casing. The latter feature results from the fact that the spring 25 is shaped to dished form with flaring lobes, such that the points of contact thereof with the impeller casing are in the noted peripheral zone, while the points of contact against the closure plate are located centrally of the same. Such spring element is unobstructive of the fluid flow and may be made of suitable crimped or shaped metal strip stock or stamping, preferably, however, a heavy gauge wire is employed. Similarly, stainless steel is the preferred material for most installations, but carbon steel, brass or bronze can also be used.

Figure 2:
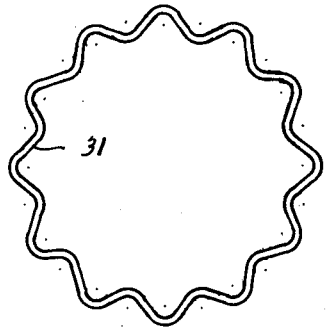
Fig. 2 is a plan view, on an enlarged scale, of one compound spring used in such meter.

The register mechanism 16 comprises a dial plate 26 which is supported in the chamber R by resting upon a ledge 27 formed in the wall of such chamber, and the gearing 28 and other actuating parts of the mechanism depend, as illustrated, from such dial plate. The top of the main housing H, like the bottom, is open and has received therein a transparent closure plate 29. This cover plate, made of glass or plastic, is held in place by a further gasket-like ring 30 received in a groove in the housing wall and partially overlying the upper peripherial edge of the plate. For the purpose of providing resilience in the mounting of the register mechanism as well, I provide a second spring element 31 of the form illustrated most clearly in Fig. 2, between the cover plate and the dial plate. Such spring element is circular and has many lobes which contact the dial plate 26 at the periphery of the same. The same choice of materials noted in connection with the first mentioned spring member also applies to this further spring.

Figure 4:
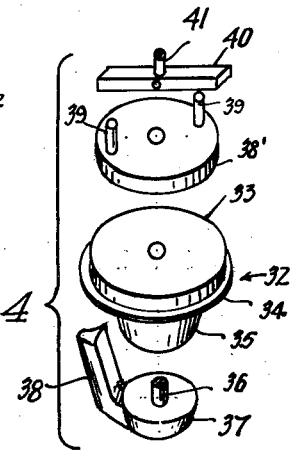
Fig. 4 is an exploded view in perspective of a portion of the drive means operative between the fluid actuated mechanism and the register mechanism.

With particular reference to Fig. 4, a guide 32 having an upper cylindrical portion 33, a flange 34, and a lower conical portion 35 is tightly fitted in an opening provided therefor in the partition 10 between the fluid and register chambers, with the conical portion being disposed in the former for engagement by the spindle 19 of the nutating piston. As the disc 13 is rocked by the fluid flow through the impeller mechanism, the spindle is guided by such engagement to sweep about the conical surface of the guide. Such motion is transmitted to a shaft 36 extending through the guide by means of a driver 37 fitted on the lower end of the shaft and having a reversely extending arm or pawl 38 which overlies the periphery of the conical guide portion. At its upper end, the shaft is fitted in a disc 38' overlying the top surface of the guide and carrying two upwardly projecting pins 39. A horizontal bar 40 is suspended in the path of rotation of such pins to be rotatably driven by the same, and an upwardly extending pin 41 is connected between the bar and the gearing 28 of the register mechanism, whereby rotation of the shaft causes the latter to be actuated.

Figure 5:
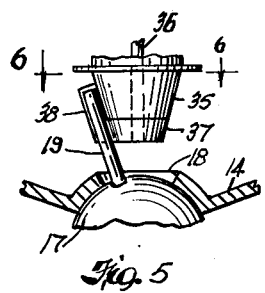
Fig. 5 is a fragmentary elevational view showing the operating connection between the fluid impelled element and the drive means of Fig. 4.
Figure 7:
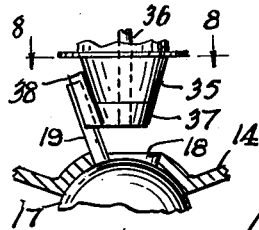
Fig. 7 is a view similar to Fig. 5 but illustrating the parts in a different relationship.
Figure 3:
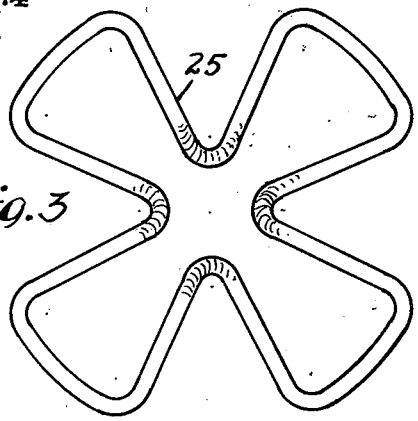
Fig. 3 is a like view of another compound spring employed in the same.
Figure 6:
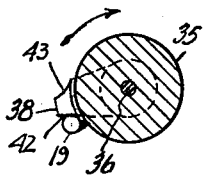
Fig. 6 is a transverse sectional view taken on the plane of the line 6—6 in Fig. 5.
Figure 8:
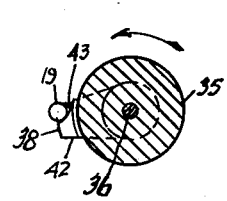
Fig. 8 is a sectional view taken on the plane of the line 8—8 in Fig. 7.

The driving pawl or arm 38 overlying as it does the conical guide surface about which the spindle 19 sweeps is, of course, driven by the spindle and thus the impeller mechanism is operative to drive the register mechanism. In accordance with my invention, such arm is formed to the cross section shown most clearly in Figs. 6 and 8, so as to have an almost radial trailing side 42, in the sense of clockwise rotation for which the assembly is designed, and an almost tangential slightly curved leading side 43. With the fluid flow normally in the direction of the arrows shown in Fig. 1, the spindle will engage with the trailing side and cause the driving arm to be rotated in the clockwise direction, as shown in Figs. 5 and 6. However, should there be a reversal in the direction of fluid flow through the meter for any reason, the spindle in sweeping back about the guide and into engagement with the sharply tapered leading side 43 of the arm will be urged outwardly away from the conical guide surface, as illustrated in Figs. 7 and 8. This results in the spindle 19 being forced against the conical wall of the opening 18 in impeller casing through which it extends, and with continued reverse force on the spindle, actually becomes wedged against the impeller casing, whereby further rotation in this counterclockwise direction is precluded. That is, the spindle is in this condition locked between the driving arm 38 and the impeller casing at the top opening 18 so that improper reverse drive of the register mechanism is prevented.

It is to be noted that the operating connection between the impeller and register mechanism is axially disruptable, either or both the mechanisms being simply withdrawable from the housing for inspection, repair and possibly replacement. Such connection furthermore provides some play between the mechanisms in normal operation, as contrasted to a rigid joint which would require each to move or receive the stress produced in response to any shock or impact received by the other.

Frictional wear in the register mechanism is further reduced by completely filling the register chamber R with suitable lubricating oil and the like, a spout 44 being provided for this purpose. While oil containing chambers housing moving parts are common in many arts, no fluid meter has to my knowledge been constructed which incorporates such a feature. Actually, the presence of the oil presents some problems in meters which are not necessarily encountered in other types of structures.

It has been found that the pressure developed by the fluid flow through the meter is transmitted through the various parts of the same to the oil, and that consequently a substantial pressure may exist in the fluid chamber, for example, a pressure on the order of fifty pounds per square inch can result. Accordingly, when the meter is disconnected from the line in which it is normally operative, so that there is no added fluid pressure in the lower portion or the fluid compartment of the same, the drop between the upper and lower compartments is usually sufficiently great to cause the oil to be forced around the drive shaft out into the fluid compartment. Such leaking and loss of the oil is, however, prevented in my new construction.

It will be noted that the disc 38' fitted to the upper end of the shaft and the upper surface of the guide portion 33 overlain thereby provide a large area of contact between the two. These two contacting surfaces are purposely machined to have a very close fit and, consequently, upon a release of the pressure in the lower compartment, the oil under pressure acts against the entire area of the plate or disc 38' forcing the same very tightly against the co-operably machined surface of the guide. A seal is thereby formed about the guide opening through which the shaft 36 extends and is effective to prevent escape of the oil therethrough.

It will accordingly be seen that my new meter embodies a shock absorbing resilient construction which normally holds the entire assembly in firm co-acting positions, while absorbing unusual stresses without damage. The register is protected against reverse movement and is, furthermore, operative with minimum frictional wear as the result of being immersed in the lubricant, while the compartments are sealed as set forth against loss of the lubricant upon disconnection of the meter. These features are all concerned with and effect prolongation of the useful life of the meter, without adding significantly to the cost of the same or rendering the structure mechanically complex.

Other modes of applying the principles of the invention may be employed, change being made as regards the details described, provided the features stated in any of the following claims or the equivalent of such be employed.

I, therefore, particularly point out and distinctly claim as my invention:

1. In a fluid meter of the type including an enclosed nutating disc and a spindle projecting therefrom through an opening in the enclosure, a guide for the spindle, the latter sweeping about the surface of such guide upon movement with the disc, register means including a drive shaft extending through said guide, and a member connected to said shaft and overlying such guide surface for engagement by the spindle, one side of said member being tapered to displace the spindle when brought into engagement with the same outwardly away from the guide and against the disc enclosure at the spindle opening, the member thereupon being wedged between the spindle and the guide to preclude further movement of the spindle in the same direction, engagement of the sweeping spindle with the other side of said member causing the latter to move freely with the spindle and thus actuate the register means.

2. In a fluid meter of the type including an enclosed nutating disc and a spindle projecting therefrom through an opening in the enclosure, a guide for the spindle, the latter sweeping about the surface of such guide upon movement with the disc, register means including a drive shaft, and a member connected to said shaft and overlying such guide surface for engagement by the spindle, one side of said member being tapered to displace the spindle when brought into engagement with the same outwardly away from the guide and against the disc enclosure at the spindle opening, the member thereupon being wedged between the spindle and the guide to preclude further movement of the spindle in the same direction, engagement of the sweeping spindle with the other side of said member causing the latter to move freely with the spindle and thus actuate the register means.

3. In a fluid meter including a nutating disc having a spindle projecting therefrom and a guide about which the spindle sweeps, a driving member overlying the guide for engagement and the drive of the same by the spindle, said driving member having a trailing side normally engaged by the spindle for such drive, displacement-confining means surrounding the normal path of movement of the sweeping spindle outwardly of the same, the leading side of the driving member being inclined to cam the spindle outwardly when engaged thereby upon reversal of the spindle movement about the guide, the spindle being thus brought against said displacement-confining means and the driving member wedged between the spindle and the guide, thereby to stop continued movement in such reverse direction, and register mechanism connected to said driving member for actuation by the same.

4. In a fluid meter including a nutating disc having a spindle projecting therefrom and a guide about which the spindle sweeps, means for restricting the direction of such sweep of the spindle comprising a member disposed adjacent the guide in the path of spindle movement thereabout, means encircling said spindle normally spaced outwardly of such path of movement of the same, said member being so shaped as to cam the spindle outwardly against such encircling means upon being engaged by the spindle in one direction only of movement thereof about the guide, the member thereupon wedging between the spindle and guide to preclude continued movement in such one direction, register means, and output means actuated in response to the movement of the spindle for driving said register means.

5. A fluid meter comprising a housing having fluid and register chambers with a partition therebetween nutating impeller mechanism including a casing and a spindle protruding through an opening in such casing, spring means resiliently supporting said casing in the fluid chamber, register mechanism in the register chamber and being movable toward and away from said partition, further spring means resiliently supporting said register mechanism therewithin, a guide mounted in such partition with its upper end in the register chamber and its lower end portion in the fluid chamber for engagement by the impeller spindle, a shaft extending through said guide, a driving member connected to one end of said shaft and disposed in the path of such spindle movement to be driven by the spindle, said driving member being shaped to cam the spindle outwardly away from the guide in one direction of spindle motion about the same and firmly against the wall of the casing opening, the driving member thereupon being wedged between the spindle and guide to arrest movement of the former in such direction, a plate connected to the other end of the shaft and overlying the upper end of the guide about the region of shaft penetration of the same, liquid lubricant in the register chamber, and extensible coupling means between said plate and the register mechanism.

References Cited in the file of this patent

UNITED STATES PATENTS

| | | |
|---|---|---|
| 626,518 | Bassett | June 6, 1899 |
| 764,605 | Lambert | July 12, 1904 |
| 783,485 | Thomson | Feb. 28, 1905 |
| 1,089,730 | Sprague | Mar. 10, 1914 |
| 1,452,018 | Allen | Apr. 17, 1923 |
| 1,995,116 | Drissner | Mar. 19, 1935 |
| 2,159,892 | Hanks | May 23, 1939 |
| 2,246,250 | Hanks | June 17, 1941 |